US009266677B2

(12) United States Patent
Isomura (10) Patent No.: US 9,266,677 B2
(45) Date of Patent: Feb. 23, 2016

(54) TRANSPORT CONVEYER AND TRANSPORT FACILITY

(75) Inventor: Takuya Isomura, Shiga (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 14/412,515

(22) PCT Filed: Jul. 4, 2012

(86) PCT No.: PCT/JP2012/067110
§ 371 (c)(1),
(2), (4) Date: Jan. 2, 2015

(87) PCT Pub. No.: WO2014/006707
PCT Pub. Date: Jan. 9, 2014

(65) Prior Publication Data
US 2015/0166266 A1   Jun. 18, 2015

(51) Int. Cl.
*B65G 13/10* (2006.01)
*B65G 47/54* (2006.01)
*B65G 47/22* (2006.01)

(52) U.S. Cl.
CPC ................ *B65G 13/10* (2013.01); *B65G 47/54* (2013.01); *B65G 47/22* (2013.01)

(58) Field of Classification Search
CPC ........ B65G 13/08; B65G 13/10; B65G 47/53; B65G 47/681; B65G 47/682
See application file for complete search history.

(56) References Cited

U.S. PATENT DOCUMENTS

| | | | | |
|---|---|---|---|---|
| 1,022,823 A | * | 4/1912 | Buck ...................... | B65G 13/10 193/36 |
| 1,824,276 A | * | 9/1931 | Kesti ...................... | B65G 13/10 193/36 |
| 1,835,823 A | * | 12/1931 | Taylor ..................... | B65G 13/10 193/36 |
| 2,634,843 A | * | 4/1953 | Timmons ................ | B65G 13/10 193/36 |
| 2,669,334 A | * | 2/1954 | Metzgar .................. | B65G 13/10 193/36 |

(Continued)

FOREIGN PATENT DOCUMENTS

| | | | | |
|---|---|---|---|---|
| GB | 2114521 A | * | 8/1983 | ........... B65G 47/681 |
| JP | S 62295823 A | | 12/1987 | |

(Continued)

OTHER PUBLICATIONS

Japanese Office Action from co-pending Japanese Application No. 2011-088170 (Publication No. JP2012218910, dated Feb. 20, 2014.
International Search Report from parent case, PCT/JP2012/067110, dated Aug. 7, 2012.

(Continued)

*Primary Examiner* — Leslie A Nicholson, III
*Assistant Examiner* — Keith R Campbell
(74) *Attorney, Agent, or Firm* — The Webb Law Firm (57) ABSTRACT

A transport conveyer includes an upstream side conveyer portion and a downstream side conveyer portion. The upstream side conveyer portion is provided such that an upstream side imaginary path line which is circular-arc-shaped is connected to a downstream side imaginary path line such that the tangent line at the downstream side end of the upstream side imaginary path line and the tangent line at the upstream side end of the downstream side imaginary path line are at the same angle. Provided on the upstream side end portion of the downstream side conveyer portion is a rotating operation transport device for supporting and transporting the article such that the amount of rotation of the article by the downstream side conveyer portion is greater than or equal to the amount of rotation caused by the downstream side conveyer portion.

13 Claims, 6 Drawing Sheets

(56) References Cited

U.S. PATENT DOCUMENTS

| | | | | |
|---|---|---|---|---|
| 2,794,529 | A | * | 6/1957 | Schmitz ................ B65G 13/10 193/36 |
| 3,616,892 | A | * | 11/1971 | Koennecke ........... B65G 13/10 198/367 |
| 3,785,469 | A | * | 1/1974 | Stumpf ................. B65G 13/10 193/36 |
| 3,912,062 | A | * | 10/1975 | Hutchinson ........... B65G 13/10 193/36 |
| 5,653,325 | A | * | 8/1997 | Enomoto ............... B65G 13/10 193/36 |
| 2007/0193859 | A1 | | 8/2007 | Kyutoku et al. |

FOREIGN PATENT DOCUMENTS

| | | |
|---|---|---|
| JP | H 093115531 A | 12/1997 |
| JP | H 10310232 A | 11/1998 |
| JP | 2005280868 A | 10/2005 |
| JP | 2007223683 A | 9/2007 |
| JP | 2010024045 A | 2/2010 |
| JP | 2010195534 A | 9/2010 |

OTHER PUBLICATIONS

International Preliminary Report on Patentability from parent case, PCT/JP2012/067110, dated Jan. 6, 2015.

* cited by examiner

TRANSPORT CONVEYER AND TRANSPORT FACILITY

CROSS-REFERENCE TO RELATED APPLICATIONS

This application is the United States national phase of International Application No. PCT/JP2012/067110 filed Jul. 4, 2012, the disclosure of which is hereby incorporated in its entirety by reference.

TECHNICAL FIELD

The present invention relates to a transport conveyer comprising an upstream side conveyer portion for supporting and transporting an article which is rectangular in shape in plan view, along an upstream side imaginary path line, and a downstream side conveyer portion for supporting and transporting an article along a downstream side imaginary path line, the downstream side conveyer portion being connected to a downstream side of the upstream side conveyer portion, wherein the upstream side imaginary path line is defined to have a circular-arc shape, and wherein the upstream side conveyer portion is configured to support and transport the article while rotating the article about a vertical axis to cause the article to be in an upstream side orientation in which a lateral side of the article is parallel to a tangent line of the upstream side imaginary path line. The present invention also relates to a transport facility equipped with such transport conveyer.

BACKGROUND ART

A transport conveyer such as one described above has a downstream side conveyer portion connected to the downstream side of an upstream side conveyer portion, and is configured to transport articles, while rotating them about vertical axes (axes extending in the vertical direction), in the upstream side conveyer portion along an upstream side imaginary path line which is defined to have a circular-arc shape, and subsequently, to continue transporting the articles in the downstream side conveyer portion. (See, for example, Patent Document 1.)

Figure 6:
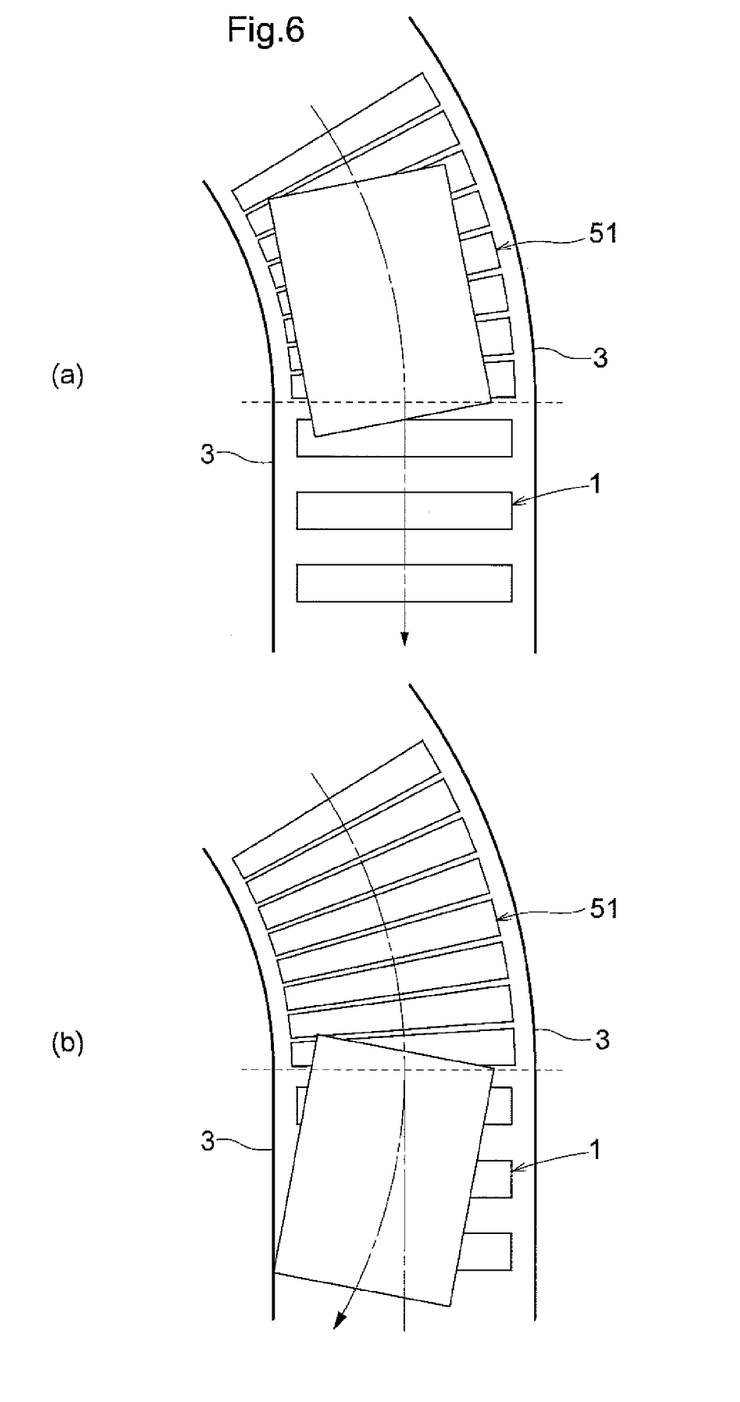
FIG. 6 is a drawing showing how the orientation of an article is changed by a conventional transport conveyer.

Incidentally, in Patent Document 1, as shown in FIG. 6, a curved roller conveyer device 51, in which the upstream side imaginary path line is defined to have a circular-arc shape, is provided as an upstream side conveyer portion whereas a linear roller conveyer device 1, in which the downstream side imaginary path line is defined to have a linear shape, is provided as the downstream side conveyer portion. And the articles are transported in the downstream side conveyer portion without rotating them about the vertical axes. In addition, such a transport conveyer is provided with a guide body which contacts peripheral surface of articles for guiding the articles so that the articles would stay within a range of a predetermined lateral width defined with respect to the transport conveyer when the articles are transported along the upstream side imaginary path line and the downstream side imaginary path line.

PRIOR ART REFERENCES

Patent Document

Patent Document 1: JP Publication of Application No. 10-310232

SUMMARY OF THE INVENTION

Problems to be Solved by the Invention

However, as in the conventional transport conveyer described above in which the upstream side conveyer portion is configured to transport an article along an upstream side imaginary path line defined to have a circular-arc shape while rotating the article about a vertical axis whereas the downstream side conveyer portion is configured to transport an article along an downstream side imaginary path line defined to have a linear shape without rotating the article about the vertical axis, the orientation of an article in plan view deviates from a downstream side orientation in which the lateral sides of the article are parallel to the downstream side imaginary path line at the connection location between the upstream side conveyer portion and the downstream side conveyer portion. To this end, the deviation of the orientation of the article from the downstream side orientation was reduced by causing a guide body to contact the peripheral surface of the article.

However, when a large deviation of the orientation of the article from the downstream side orientation is reduced by causing the guide body to contact the peripheral surface of the article, there is a possibility that the article is abraded due to the contacting of the peripheral surface of the article by the guide body; thus, it is more desirable to avoid the contacting of the article by the guide body to the extent possible.

Therefore, a transport conveyer is desired which can transport articles easily from the upstream side conveyer portion through the downstream side conveyer portion such that the articles are not contacted by the guide body to the extent possible.

Means for Solving the Problems

A transport conveyer in accordance with the present invention comprises: an upstream side conveyer portion for supporting and transporting an article which is rectangular in shape in plan view, along an upstream side imaginary path line; and a downstream side conveyer portion for supporting and transporting an article along a downstream side imaginary path line, the downstream side conveyer portion being connected to a downstream side of the upstream side conveyer portion; wherein the upstream side imaginary path line is defined to have a circular-arc shape, and wherein the upstream side conveyer portion is configured to support and transport the article while rotating the article about a vertical axis to cause the article to be in an upstream side orientation in which a lateral side of the article is parallel to a tangent line of the upstream side imaginary path line. And its first characteristic configuration is that a guide body is provided for guiding the article along the upstream side imaginary path line and the downstream side imaginary path line by contacting a peripheral surface of the article, the guide body being provided along the upstream side imaginary path line and the downstream side imaginary path line, wherein the upstream side conveyer portion is provided such that the upstream side imaginary path line is connected to the downstream side imaginary path line, and such that a tangent line of the upstream side imaginary path line at a downstream side end thereof and an upstream side end, or a tangent line at the upstream side end, of the downstream side imaginary path line are at a same angle, and wherein there is provided a rotating operation transport device: which is provided in a downstream side end portion of the upstream side conveyer portion and which supports and transports the article such that an amount of rotation of the article that accompanies transporting by the upstream side conveyer portion is less than or equal to an amount of rotation caused by the upstream side conveyer portion; or which is provided in an upstream side end portion of the downstream side conveyer portion and which supports and transports the article such that an amount of rotation of the article that accompanies transporting by the downstream side conveyer portion is greater than or equal to an amount of rotation caused by the downstream side conveyer portion.

That is, when the rotating operation transport device is provided in the downstream side end portion of the upstream side conveyer portion, the article is supported and transported such that the amount of rotation of the article that accompanies transporting by the upstream side conveyer portion is less than or equal to an amount of rotation caused by the upstream side conveyer portion. And when the rotating operation transport device is provided in the upstream side end of the downstream side conveyer portion, the article is supported and transported such that an amount of rotation of the article that accompanies transporting by the downstream side conveyer portion is greater than or equal to an amount of rotation caused by the downstream side conveyer portion.

In other words, with the conventional transport conveyer in which the rotating operation transport device is not provided, and when an article moves from the upstream side conveyer portion and onto the downstream side conveyer portion, the orientation of the article tends to deviate to a large degree from the downstream side orientation in which the lateral side of the article is parallel to the downstream side imaginary path line or its tangent line.

To describe in more detail, when supporting and transporting an article with the transport conveyer, the frictional force from the transport conveyer on the back part of the bottom surface of the article is greater than the frictional force from the transport conveyer on the front part of the bottom surface of the article. This is believed to be caused by the fact that the weight of the article is shifted toward its back when the article is supported and transported and the contact pressure against the transport conveyer from the back part of the bottom surface of the article becomes greater than the contact pressure against the transport conveyer from the front part of the bottom surface of the article.

And when the frictional force on the back part of the bottom surface of the article is greater than the frictional force on the front part of the bottom surface of the article, it becomes easier for the propelling force to be applied to the back part of the bottom surface than to the front part of the bottom surface, and becomes more difficult for the propelling force to be applied to the front part of the bottom surface. Thus, when an article is transported to the connection location between the upstream side conveyer portion and the downstream side conveyer portion, the propelling force acting on the back part of the article which remains in the upstream side conveyer portion becomes dominant despite the fact that the front part of the article has moved onto the downstream side conveyer portion; thus, the article is supported and transported while being rotated about a vertical axis toward the upstream side orientation, as when the article is being transported by the upstream side conveyer portion. This is believed to be the cause of the large deviation of the article from the downstream side orientation when the article moves from the upstream side conveyer portion and onto the downstream side conveyer portion.

To this end, the rotating operation transport device is provided in the downstream side end portion of the upstream side conveyer portion and is caused to support and transport the article such that the amount of rotation of the article that accompanies transporting by the upstream side conveyer portion is less than or equal to the amount of rotation caused by the upstream side conveyer portion. Alternatively the rotating operation transport device is provided in the upstream side end portion of the downstream side conveyer portion and is caused to support and transport the article such that the amount of rotation of the article that accompanies transporting by the downstream side conveyer portion is greater than or equal to the amount of rotation caused by the downstream side conveyer portion. When the article moves from the upstream side conveyer portion and onto the downstream side conveyer portion, the article tends to rotate about the vertical axis as when it is being transported by the upstream side conveyer, due to the propelling force applied by the upstream side conveyer portion to the back part of the article. However, the propelling force applied on the article by the rotating operation transport device acts on the front of the article in the direction that tends to reduce the rotation of the article, thus preventing the article from deviating to a large extent from the downstream side orientation.

In other words, by reducing the deviation of the article from the downstream side orientation when the article moves from the upstream side conveyer portion and onto the downstream side conveyer portion, it becomes easier to cause the article to stay within the range of the set lateral width defined in advance with respect to the transport conveyer; so, it becomes easier to transport the article from the downstream side conveyer portion through the upstream side conveyer portion without causing the article to contact the guide body to the extent possible. And when an article deviates from the upstream side orientation or the downstream side orientation due to a transporting error etc., and it tries to move out from within the range of the set lateral width, the article can be made to stay within the range of set lateral width by the guide body contacting the peripheral surface of the article. Thus the articles can be prevented from, for example, falling from the transport conveyer before it happens.

Therefore, a transport conveyer can be provided in which it is easier to transport articles from the upstream side conveyer portion through the downstream side conveyer portion without the articles contacting the guide body to the extent possible, by supporting and transporting the articles by means of the rotating operation transport device in the downstream side end portion of the upstream side conveyer portion or in the upstream side end of the downstream side conveyer portion.

The second characteristic configuration of the transport conveyer in accordance with the present invention is that, in the first characteristic configuration of the transport conveyer, the upstream side imaginary path line of the upstream side conveyer portion is defined to have a circular-arc shape which curves toward a first direction out of right and left directions, wherein the downstream side imaginary path line of the downstream side conveyer portion is defined to have a circular-arc shape which curves toward a second direction out of the right and left directions, and wherein the upstream side conveyer portion and the downstream side conveyer portion are provided such that the tangent line of the upstream side imaginary path line at the downstream side end thereof and the tangent line of the downstream side imaginary path line at the upstream side end thereof are at a same angle.

In other words, the upstream side imaginary path line of the upstream side conveyer portion is defined to have a circular-arc shape which curves toward a first direction out of right and left directions whereas the downstream side imaginary path line of the downstream side conveyer portion is defined to have a circular-arc shape which curves toward a second direction out of the right and left directions; thus, the downstream side imaginary path line has a circular-arc shape which curves toward a direction opposite from the upstream side imaginary path line.

When the downstream side imaginary path line has a circular-arc shape which curves toward a direction opposite from the upstream side imaginary path line in this manner, the front part of an article which moves onto the downstream side conveyer portion would advance in a direction opposite from the direction in which the downstream side imaginary path line curves; thus, the orientation of the article easily deviates to a large extent from the downstream side orientation compared with the case where the downstream side imaginary path line is defined to have a linear shape. However, an article can be transported without deviating from the downstream side orientation to a large extent by providing the rotating operation transport device.

The third characteristic configuration of the transport conveyer in accordance with the present invention is that, in the second characteristic configuration of the transport conveyer, each of the upstream side conveyer portion and the downstream side conveyer portion is configured to be of a roller drive type in which the article is supported and transported by rotation of driving rollers which are driven and rotated by an actuating device, wherein the driving roller provided on an upstream side of the downstream side end portion of the upstream side conveyer portion is provided in such an orientation that its pivot axis is directed toward a center of curvature of the upstream side imaginary path line, wherein the driving roller provided on an downstream side of the upstream side end portion of the downstream side conveyer portion is provided in such an orientation that its pivot axis is directed toward a center of curvature of the downstream side imaginary path line, wherein the driving roller, provided in the downstream side end portion of the said upstream side conveyer portion or in the upstream side end portion of the downstream side conveyer portion, functions as the rotating operation transport device, and wherein the driving roller that functions as the rotating operation transport device is provided in such an orientation that a pivot axis of the driving roller perpendicularly intersects a line segment that connects an intermediate location on the upstream side imaginary path line with an intermediate location on the downstream side imaginary path line, and that passes through a connecting point between the upstream side imaginary path line and the downstream side imaginary path line.

In other words, since the driving roller provided on an upstream side of the downstream side end portion of the upstream side conveyer portion is provided in such an orientation that its pivot axis is directed toward a center of curvature of the upstream side imaginary path line, an article is transported on an upstream side of the downstream side end portion of the upstream side conveyer portion while being rotated about the vertical axis to cause the article to be in the upstream side orientation in which its lateral side is parallel to the tangent line of the upstream side imaginary line.

Also, since the driving roller provided on a downstream side of the upstream side end portion of the downstream side conveyer portion is provided in such an orientation that its pivot axis is directed toward a center of curvature of the downstream side imaginary path line, an article is transported on an downstream side of the upstream side end portion of the downstream side conveyer portion while being rotated about the vertical axis to cause the article to be in the downstream side orientation in which its lateral side is parallel to the tangent line of the downstream side imaginary line.

And since the driving roller, that functions as the rotating operation transport device and that is provided in the downstream side end portion of the upstream side conveyer portion or in the upstream side end portion of the downstream side conveyer portion, is provided in such an orientation that its pivot axis perpendicularly intersects tangent line at the connecting point at which the upstream side imaginary path line is connected to the downstream side imaginary path line, the rotation of the orientation of the article can be reduced on the downstream side end portion of the upstream side conveyer portion or the rotation of the orientation of the article can be increased on the upstream side end portion of the downstream side conveyer portion, compared with the case where the driving roller that functions as the rotating operation transport device is provided in such an orientation that it is directed toward the center of curvature of the downstream side imaginary path line or of the upstream side imaginary path line, as in the case with other driving rollers.

Thus, the rotating operation transport device can be formed by providing the driving roller provided in the downstream side end portion of the upstream side conveyer portion or in the upstream side end portion of the downstream side conveyer portion, in an orientation different from the orientations of other driving rollers. And when a plurality of driving rollers are provided to function as the rotating operation transport device, the rotating operation transport device can be provided easily since the plurality of driving rollers can be provided in the same orientation.

The fourth characteristic configuration of the transport conveyer in accordance with the present invention is that, in the third characteristic configuration of the transport conveyer, the driving rollers are so positioned to be outward of freely rotatable driven rollers for receiving and supporting the article, along a direction along a radius of curvature of the upstream side imaginary path line or the downstream side imaginary path line.

That is, by positioning the driving rollers so that they are located outwardly of freely rotatable driven rollers along a direction along a radius of curvature of the upstream side imaginary path line or the downstream side imaginary path line, the article can be transported along the circular-arc-shaped imaginary path line while rotating the article about the vertical axis.

And by receiving and supporting an article by providing the driving rollers and the driven rollers as described above, a common cylindrical roller can be used as the driving rollers and the driven rollers; thus, the driving rollers and the driven rollers can be easily formed without having to use special rollers having a conical shape.

The first characteristic configuration of the transport facility in accordance with the present invention is that a linear conveyer for supporting and transporting an article along a linear imaginary path line defined to have a linear shape; wherein the transport conveyer of one of the first to the fourth characteristics is provided as a diverging transport conveyer for performing a diverging transport of the article from the linear conveyer, or as a converging transport conveyer for performing a converging transport of the article into the linear conveyer.

Thus, the transport conveyer equipped with the rotating operation transport device can be used as a diverging transport conveyer for performing the diverging transport of the article from the linear conveyer, or as a converging transport conveyer for performing the converging transport of the article into the linear conveyer. Also, when using a transport conveyer as a diverging transport conveyer or as a converging transport conveyer, its transporting direction for articles is often changed at intermediate locations such as by defining the imaginary path line of the transport conveyer in an S-shape. However, by providing the transport conveyer with the rotating operation transport device, the article can be prevented from deviating to a large extent from the downstream side orientation when the article moves from the upstream side conveyer portion and onto the downstream side conveyer portion, by the function of the rotating operation transport device. Thus, a transport facility can be provided which can perform the diverging transport and the converging transport of articles in proper orientations without the articles contacting the guide body to the extent possible.

The second characteristic configuration of the transport facility in accordance with the present invention is that the linear conveyer includes a pair of transport portions which are spaced apart from each other in a lateral direction of the linear conveyer, and which are configured to support and transport an article along the linear imaginary path line while receiving and supporting both end portions, in the lateral direction, of the article, wherein the transport conveyer includes a connection portion located between the pair of transport portions of the linear conveyer, and a side portion located to a lateral side of the linear conveyer, wherein the side portion is so provided that a transporting surface of the side portion is located higher than transporting surfaces of the pair of transport portions, wherein the connection portion can be moved vertically between a transport position in which a transporting surface of the connection portion is higher than the transporting surfaces of the pair of transport portions and is at a same height as the transporting surface of the side portion, and a retracted position in which the transporting surface of the connection portion is lower than the transporting surfaces of the pair of transport portions.

That is, by lowering the connection portion of the transport conveyer to the retracted position, the article can be transported along the linear imaginary path line by the transporting action of the linear conveyer without causing the article to diverge away from the linear conveyer. In addition, by raising the connection portion of the transport conveyer to the transport position, the article is moved onto the connection portion of the transport conveyer at an intermediate location during the transporting of the article on the linear conveyer. Subsequently, the article is diverged from the linear imaginary path line of the linear conveyer to be transported along the upstream side imaginary path line and the downstream side imaginary path line, by the transporting action of the connection portion and the transporting action of the side portion.

And it is conceivable to perform a diverging transport or converging transport to transport the article away from, or into, the linear conveyer by the guiding action of a guide body by projecting the guide body into the transporting path when performing the diverging transport or converging transport of the article, from or into the linear conveyer. However, by performing the diverging transport or the converging transport of the article from, or into, the linear conveyer by the transporting action of the transport conveyer, the peripheral surface of the article does not have to contact the guide body when performing the diverging transport or converging transport of the article. Thus, articles can be transported without the peripheral surface of the articles contacting the guide body to the extent possible in a diverging transport and a converging transport.

The third characteristic configuration of the transport facility in accordance with the present invention is that, in the second characteristic configuration of the transport facility, a plurality of the connection portions of the transport conveyer are provided along the linear imaginary path line of the linear conveyer, wherein each of the plurality of connection portions is configured to be able to be vertically moved independently from one another.

That is, since a plurality of the connection portions of the transport conveyer are provided along the linear imaginary path line of the linear conveyer with each of the plurality of connection portions being configured to be able to be vertically moved independently from one another, the plurality of connection portions can be raised to the transport position simultaneously or one by one and the connection portion on the upstream side can be lowered to the retracted position when an article is moved from a connection portion on the upstream side and onto a connection portion on the downstream side. And by lowering the connection portion on the upstream side to the retracted position first, an article being transported by the linear conveyer can be accepted into the location in which the connection portion on the downstream side is provided even while an article is supported and transported by the connection portion on the downstream side; thus, the distances between the transported articles can be made small, allowing the transport efficiency to be improved.

The fourth characteristic configuration of the transport facility in accordance with the present invention is that, in the second or third characteristic configuration of the transport facility, a plurality of driving rollers that are provided in the connection portion and that are driven and rotated by an actuating device are disposed one next to another: along a circular arc along the upstream side imaginary path line of the upstream side conveyer portion; or along the downstream side imaginary path line of the downstream side conveyer portion, in which the plurality of driving rollers are provided, and wherein a first group of driving rollers which are a part of the plurality of the driving rollers are disposed one next to another such that a radius of curvature for the first group of driving rollers is smaller compared with a radius of curvature for a second group of driving rollers, among the plurality of the driving rollers, that are located closer to the side portion than the first group of driving rollers.

That is, there is a constraint on the plurality of driving rollers provided in the connection portion that they have to be located between the pair of transport portions; thus, when all of the plurality of driving rollers are disposed one next to another along a circular-arc having the same radius of curvature, the driving rollers cannot be disposed over a large range along the imaginary path line. However, the driving rollers can be provided over a large range along the imaginary path line by disposing the first group of driving rollers, which are a part of the driving rollers provided in the connection portion, one next to another such that the radius of curvature for the first group of driving rollers is smaller compared with the radius of curvature for the second group of driving rollers, among the plurality of the driving rollers, that are located farther away from the side portion than the first group of driving rollers along the direction along the imaginary path line.

And by arranging the driving rollers over a large range along the imaginary path line, it is made easier to appropriately transport an article that is transported and diverged away from the linear conveyer, or an article that is transported and converged into the linear conveyer, along the imaginary path line.

MODES FOR CARRYING OUT THE INVENTION

The embodiment of the present invention is described next with reference to the drawings.

Figure 1:
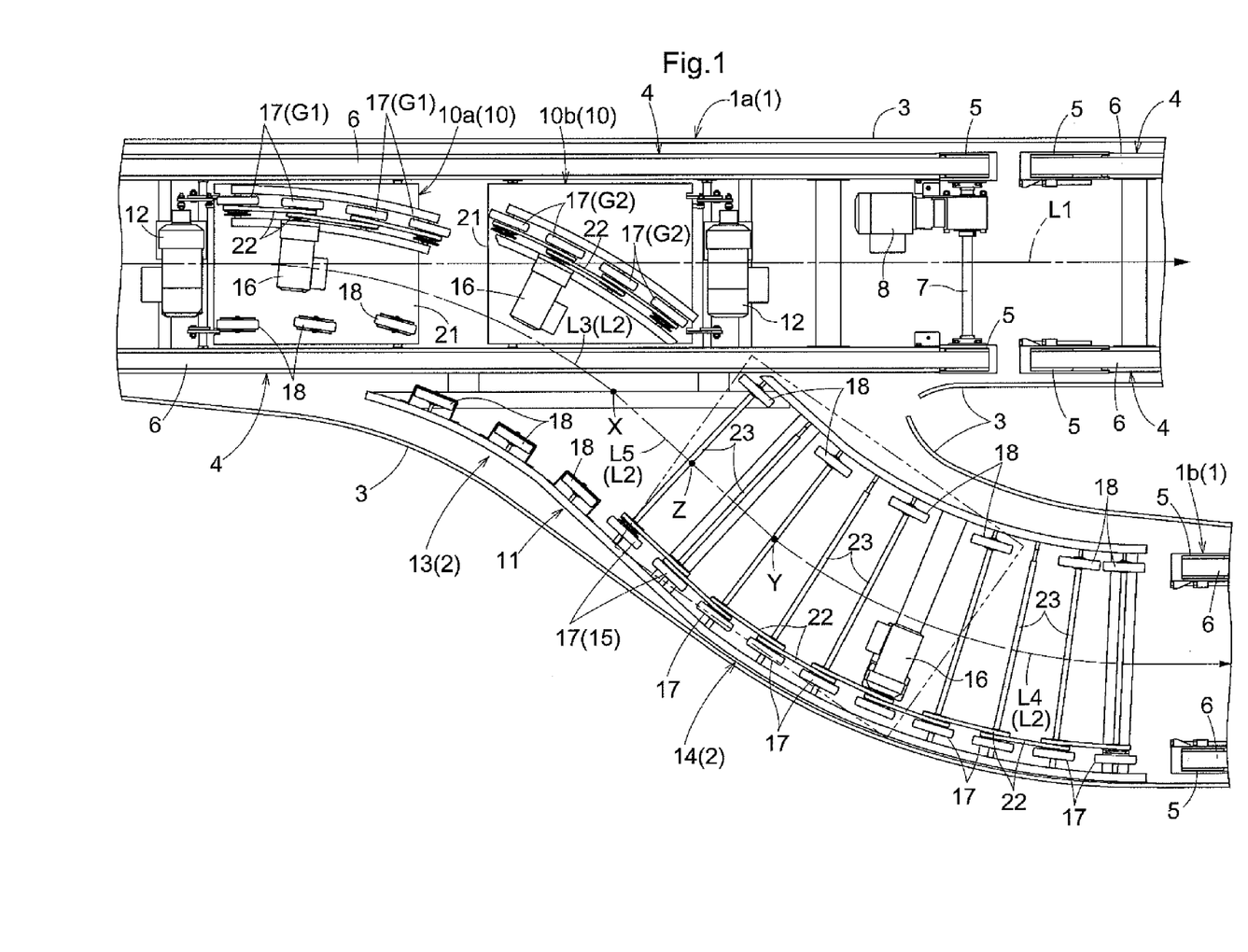
FIG. 1 is a plan view of a transport facility in accordance with an embodiment of the present invention.

As shown in FIG. 1, a transport facility includes a linear conveyer 1 which supports and transports articles along a linear imaginary path line L1 defined to have a linear shape, and a curved conveyer 2 which supports and transports articles along a curved imaginary path line L2 defined to have a circular-arc shape (which corresponds to a transport conveyer). The articles in the present embodiment are large plastic trays that are rectangular in shape in plan view, and are transported in such orientations that the longitudinal direction of each article is aligned with, or parallel to, the transporting direction of the conveyer and that the direction of the shorter sides of each article are aligned with, or parallel to, a lateral direction of the conveyer. Note that the sides along the longitudinal direction of each article correspond to the lateral sides of the article.

In addition, the linear conveyer 1 is provided with guide bodies 3 such that they extend along the linear imaginary path line L1. The curved conveyer 2 is provided with guide bodies 3 such that they extend along the curved imaginary path line L2 (upstream side imaginary path line L3 and downstream side imaginary path line L4, described later). The guide body 3 is provided on both sides with respect to the transporting direction such that the guide bodies 3 are spaced apart from each other by a distance of a set lateral width. And the guide bodies 3 are provided at locations that are higher by a set height than the transporting surfaces of the linear conveyer 1 and the curved conveyer 2. And the guide bodies 3 are configured to guide the movements of the articles along the linear imaginary path line L1 and the curved imaginary path line L2 without allowing the articles to move out of the predetermined lateral width defined with respect to the linear conveyer 1 and the curved conveyer 2, by contacting the peripheral surfaces of the articles including corners and side faces of the articles.

Provided as the linear conveyer 1 is a pair of linear conveyers 1 which consists of a linear conveyer 1 (referred to, hereinafter, as the primary linear conveyer 1a) to which one end portion of the curved conveyer 2 is connected at an intermediate portion along the transporting direction, and a linear conveyer 1 (referred to, hereinafter, the secondary linear conveyer 1b) having an end, along its transporting direction, to which the other end portion of the curved conveyer 2 is connected. The primary linear conveyer 1a and the secondary linear conveyer 1b are disposed such that their linear imaginary path lines L1, which are the paths for transporting articles, are parallel to each other.

And the curved conveyer 2 is provided either as a diverging transport conveyer which performs a diverging transport, or branching transport, of articles from the linear conveyer 1, or as a converging transport conveyer which performs converging transport, or merging, transport of the articles into the linear conveyer 1. When the curved conveyer 2 is provided as a diverging transport conveyer, an article is supported and transported from one end portion side to the other end portion side to perform a diverging transport of the article from the primary linear conveyer 1a to the curved conveyer 2. When the curved conveyer 2 is provided as a converging transport conveyer, an article is supported and transported from the other end portion side to one end portion side to perform a converging, or merging, transport of the article from the curved conveyer 2 to the primary linear conveyer 1a.

The primary linear conveyer 1a includes a pair of belt type transport portions 4 (the first transport portion 4 and the second transport portion 4) arranged such that they are spaced apart from each other in the lateral direction of the primary linear conveyer 1a. And the primary linear conveyer 1a is configured to support and transport an article such that the pair of transport portions 4 receive and support both ends, in the lateral direction, of the article.

Each of the pair of transport portions 4 includes a circulating belt 6 which goes over a plurality of rotation pulleys 5. A driving rotation pulley 5 of the first transport portion 4 and a driving rotation pulley 5 of the second transport portion 4 are operatively connected by means of an interlocking drive shaft 7. And an electric motor 8 for the belts which drivingly rotates the interlocking drive shaft 7 is provided to the primary linear conveyer 1a.

And the primary linear conveyer 1a is configured to support and transport an article along the linear imaginary path line L1 by drivingly rotating the interlocking drive shaft 7 with the electric motor 8 for the belts to drive the pair of transport portions 4 in synchronization with each other, without changing the orientation of the article received and supported by the pair of circulating belts 6 (without rotating the article about a vertical axis which is an axis extending along the vertical direction).

Since the structure of the secondary linear conveyer 1b is similar to that of the primary linear conveyer 1a, its description is omitted.

The curved conveyer 2 is described next. Since the curved conveyer 2 is provided as a diverging transport conveyer in the present embodiment, the side thereof that is connected to the primary linear conveyer 1a will be referred to in the description as the upstream side whereas the side thereof that is connected to the secondary linear conveyer 1b will be referred to as the downstream side.

As shown in FIG. 1, the curved conveyer 2 includes connection portions 10 located between the pair of transport portions 4 in the primary linear conveyer 1a, and a side portion 11 located to a lateral side of the primary linear conveyer 1a.

Figure 2:
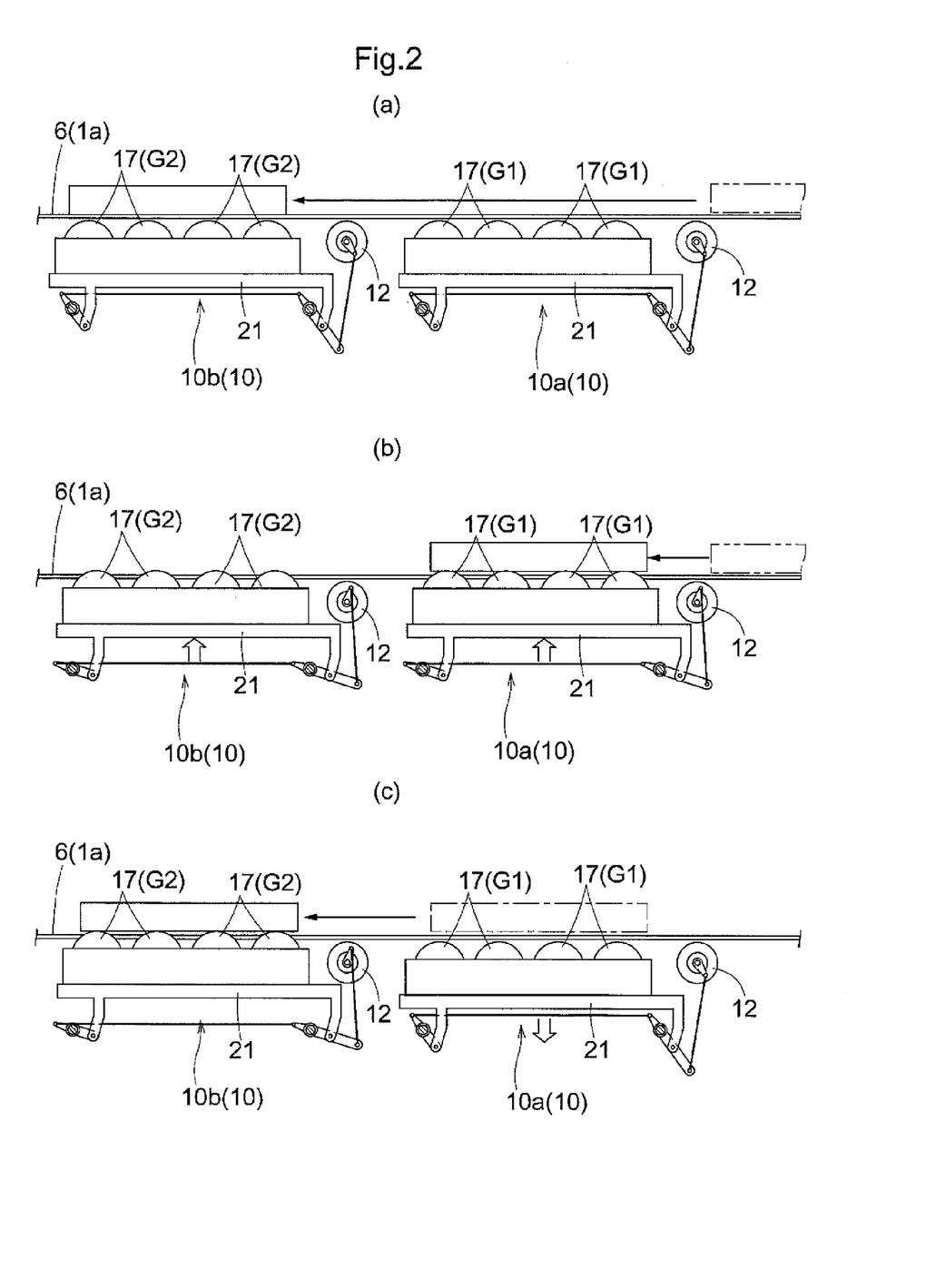
FIG. 2 shows how a pair of connection portions are vertically moved in accordance with an embodiment of the present invention.

The side portion 11 is provided such that the transporting surface of the side portion 11 is located at a height higher than the transporting surfaces of the pair of transport portions 4. The connection portions 10 are provided such that they can be vertically moved between a transport position (see FIG. 2(b)) in which the transporting surfaces of the connection portions 10 are higher than the transporting surfaces of the pair of transport portions 4 and are at the same height as the transporting surface of the side portion 11, and a retracted position in which the transporting surfaces of the connection portions 10 are lower than the transporting surfaces of the pair of transport portions 4 (see FIG. 2(a)).

And as shown in FIG. 2(b), by raising the connection portions 10 to the transport position, an article transported along the linear imaginary path line L1 by the transporting action of the primary linear conveyer 1a is moved onto the connection portions 10 at the diverging location in which the connection portions 10 are disposed, and is subsequently transported along the curved imaginary path line L2 by the transporting action of the connection portions 10 of the curved conveyer 2. In addition, as shown in FIG. 2(a), by lowering the connection portions 10 to the retracted position, an article transported along the linear imaginary path line L1 by the transporting action of the primary linear conveyer 1a does not move onto the connection portions 10 at diverging location and is transported along the linear imaginary path line L1 by the transporting action of the primary linear conveyer 1a, and is thus transported straight forward.

As shown in FIGS. 1 and 2, two connection portions 10 are provided to the curved conveyer 2 along the linear imaginary path line L1 of the linear conveyer 1. And each of these two connection portions 10 can be vertically moved independently from the other.

And, operations of vertical movement electric motors 12 of the two connection portions 10 are controlled by a controller (not shown) such that, as shown in FIG. 2(b), the two connection portions 10 are simultaneously raised from the retracted position to the transport position before an article is transported to the diverging location, and such that, as shown in FIG. 2(c), when the article has moved onto the downstream side connection portion 10b from the upstream side connection portion 10a, the upstream side connection portion 10a is lowered to the retracted position, and such that when the article has moved onto the side portion 11 from the downstream side connection portion 10b, the downstream side connection portion 10b is lowered to the retracted position. Therefore, by lowering the upstream side connection portion 10a to the retracted position first, the next article being transported straight forward can be accepted into the diverging location even if the downstream side connection portion 10b is still supporting and transporting an article; thus, a plurality of articles can be transported while keeping the distances between the articles being transported small.

As shown in FIG. 1, the curved conveyer 2 includes an upstream side conveyer portion 13 which supports and transports articles along an upstream side imaginary path line L3, and a downstream side conveyer portion 14 which is connected to the downstream side of the upstream side conveyer portion 13 and which supports and transports an article along a downstream side imaginary path line L4. The connection portions 10 are defined by a portion of the upstream side conveyer portions 13 whereas the side portion 11 is defined by the remaining portion of the upstream side conveyer portion 13 and the downstream side conveyer portion 14.

The upstream side of the upstream side conveyer portion 13 is connected to the primary linear conveyer 1a whereas the downstream side of the downstream side conveyer portion 14 is connected to the secondary linear conveyer 1b. Provided in the upstream side end portion of the downstream side conveyer portion 14 is a rotating operation transport device 15 which supports and transports an article such that the amount of rotation of the article that accompanies the transporting by the downstream side conveyer portion 14 is greater than or equal to the amount of rotation caused by the downstream side conveyer portion 14. Here, the amount of rotation of an article is defined to be the angle of rotation of the orientation in plan view per unit amount of transported distance, of the transported article. The amount of rotation caused by the downstream side conveyer portion 14 is the amount of rotation of an article when the article is supported and transported in the downstream side orientation and along the downstream side imaginary path line L4.

The upstream side imaginary path line L3 is defined to have a circular-arc shape. And the upstream side conveyer portion 13 is configured to support and transport an article while rotating the article about a vertical axis to cause the article to be in an upstream side orientation in which the lateral sides of the article are parallel to the tangent line of the upstream side imaginary path line L3. Also, the downstream side imaginary path line L4 is also defined to have a circular-arc shape. And the downstream side conveyer portion 14 is configured to support and transport an article while rotating the article about a vertical axis to cause the article to be in a downstream side orientation in which the lateral sides of the article are parallel to the tangent line of the downstream side imaginary path line L4.

To describe in more detail, the tangent line of the upstream side imaginary path line L3 to which the lateral sides of an article are parallel is the tangent line of the upstream side imaginary path line L3 at the intersection between: a line segment, or the extension thereof, connecting the center of the article along the longitudinal direction and the center of curvature P of the upstream side imaginary path line L3; and the upstream side imaginary path line L3, when the article is located on the upstream side conveyer portion 13. And the direction of this tangent line changes as the article is supported and transported by the upstream side conveyer portion 13. The upstream side conveyer portion 13 is configured to support and transport the article while rotating it about a vertical axis such that the angle of the lateral sides of the article changes as the angle of the tangent line changes.

Also, the tangent line of the downstream side imaginary path line L4 to which the lateral sides of an article are parallel is the tangent line of the downstream side imaginary path line L4 at the intersection between; a line segment, or the extension thereof, connecting the center of the article along the longitudinal direction and the center of curvature P of the downstream side imaginary path line L4; and the downstream side imaginary path line L4, when the article is located on the downstream side conveyer portion 14. And the direction of this tangent line changes as the article is supported and transported by the downstream side conveyer portion 14. The downstream side conveyer portion 14 is configured to support and transport the article while rotating it about a vertical axis such that the angle of the lateral sides of the article changes as the direction of the tangent line changes.

And the upstream side imaginary path line L3 in the upstream side conveyer portion 13 is defined to have a circular-arc shape which curves toward the right which is a first direction out of right and left directions whereas the downstream side imaginary path line L4 in the downstream side conveyer portion 14 is defined to have a circular-arc shape which curves toward the left which is a second direction out of the right and left directions. And the upstream side conveyer portion 13 is disposed such that the upstream side imaginary path line L3 is connected to the downstream side imaginary path line L4 and such that the tangent line at the downstream side end of the upstream side imaginary path line L3 and the tangent line at the upstream side end of the downstream side imaginary path line L4 are at the same angle.

Thus, the upstream side imaginary path line L3 is defined to curve in the direction opposite from the direction in which the downstream side imaginary path line L4 is curved. And thus the upstream side imaginary path line L3 and the downstream side imaginary path line L4 together define an S-shaped curved imaginary path line L2. And because the downstream side imaginary path line L4 is defined to curve in the direction opposite from the direction in which the upstream side imaginary path line L3 is curved, the upstream side conveyer portion 13 is configured to support and transport an article while the article is rotated in the clockwise direction in plan view by the propelling force that acts on the bottom surface of the article whereas the downstream side conveyer portion 14 is configured to support and transport an article while the article is rotated in the counter-clockwise direction in plan view by the propelling force that acts on the bottom surface of the article.

The structure of the curved conveyer 2 is described more specifically next.

Each of the upstream side conveyer portion 13 and the downstream side conveyer portion 14 is configured to be of a roller drive type which supports and transports articles by the rotation of a plurality of driving rollers 17 which are driven and rotated by an electric motor 16 for rollers which functions as an actuating device. The driving rollers 17 provided to the curved conveyer 2 are configured such that all of them have the same diameter, rotate at the same rotational speed, and thus have the same circumferential speed. And an article is supported and transported such that a first portion, in the lateral direction, of an article is received and supported by a plurality of driving rollers 17, and a second portion, in the lateral direction, of the article is received and supported by a plurality of driven rollers 18 which can rotate freely.

And the eight driving rollers 17 provided in the upstream side conveyer portion 13 are located to the left of the upstream side imaginary path line L3 as seen in the transporting direction so that they are located outwardly of the upstream side imaginary path line L3, along the direction of, or along, the radius of curvature of the circular-arc-shaped upstream side imaginary path line L3. And the six driven rollers 18 provided in the upstream side conveyer portion 13 are located to the right of the upstream side imaginary path line L3 as seen in the transporting direction so that they are located inwardly of the upstream side imaginary path line L3, along the direction of, or along, the radius of curvature of the upstream side imaginary path line L3. Thus, the eight driving rollers 17 provided in the upstream side conveyer portion 13 are located outwardly of the six driven rollers 18 provided to the upstream side conveyer portion 13, along the direction of, or along, the radius of curvature of the upstream side imaginary path line L3.

Figure 3:
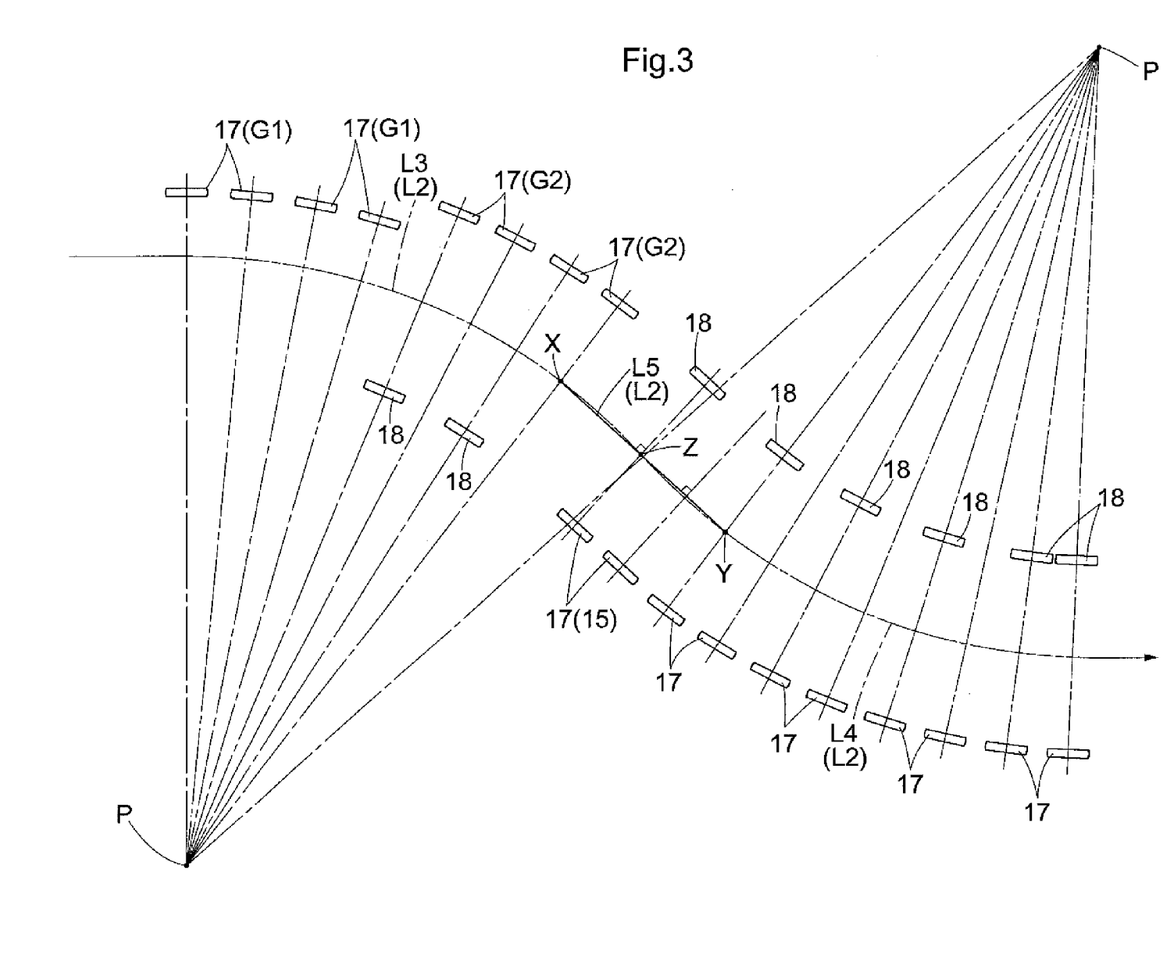
FIG. 3 is a plan view showing orientations of the driving rollers in accordance with an embodiment of the present invention.

As shown in FIG. 3, the eight driving rollers 17 provided in the upstream side conveyer portion 13 are disposed one next to another along the upstream side imaginary path line L3 in such orientations that their pivot axes are directed toward the center of curvature P of the upstream side imaginary path line L3. In other words, these eight driving rollers 17 are disposed one next to another along the upstream side imaginary path line L3 in such orientations that their pivot axes extend along the radius of curvature of the upstream side imaginary path line L3. Incidentally, although the six driven rollers 18 provided to the upstream side conveyer portion 13 are disposed one next to another along the upstream side imaginary path line L3 in such orientations that their pivot axes are directed toward the center of curvature P of the upstream side imaginary path line L3, they do not necessarily have to be disposed such that their pivot axes are directed toward the center of curvature P of the upstream side imaginary path line L3.

As shown in FIG. 1, among the eight driving rollers 17 provided to the upstream side conveyer portion 13, a first group of driving rollers G1, which are a group of driving rollers 17 consisting of the four driving rollers 17 on the upstream side, are rotatably supported by a vertically movable platform 21 of the upstream side connection portion 10 whereas a second group of driving rollers G2, which are a group of driving rollers 17 consisting of the four driving rollers 17 on the downstream side, are rotatably supported by a vertically movable platform 21 of the downstream side connection portion 10. And the four driving rollers 17 of each connection portion 10 are operatively connected to one another by an interlocking belt 22. And the four driving rollers 17 are driven and rotated by the drive power of an electric motor 16 for rollers. Thus, the first group of four driving rollers G1 on the upstream side and the second group of four driving rollers G2 on the downstream side are configured such that each group can be driven and rotated independently of the other.

As shown in FIG. 1, among the eight driving rollers 17 provided to the pair of connection portions 10, the first group of four driving rollers G1 on the upstream side are located farther away from the side portion 11, along the direction along the upstream side imaginary path line L3, than the second group of four driving rollers G2 on the downstream side 4. In addition, as shown in FIG. 3, the first group of driving rollers G1 are disposed one next to another along a circular-arc such that its radius of curvature is smaller than that of the second group of driving rollers G2. The first group of four driving rollers G1 on the upstream side, and the second group of four driving rollers G2 on the downstream side have different radii of curvature; however, they are arranged along the circular-arc of the same center of curvature P. Thus, each group of driving rollers are provided along the upstream side imaginary path line L3 of the upstream side conveyer portion 13 to which the group of driving rollers are provided.

Six driven rollers 18 are provided to the upstream side conveyer portion 13. Among the six driven rollers 18 provided to the upstream side conveyer portion 13, three driven rollers 18 on the upstream side are rotatably supported by the vertically movable platform 21 of the upstream side connection portion 10 whereas three driven rollers 18 on the downstream side are rotatably supported by the side portion 11.

And the three driven rollers 18 on the upstream side are disposed one next to another along the linear imaginary path line L1 whereas the three driven rollers 18 on the downstream side are disposed one next to another along the upstream side imaginary path line L3.

The ten driving rollers 17 provided to the downstream side conveyer portion 14 are located to the right of the downstream side imaginary path line L4 as seen in the transporting direction so that they are located outwardly of the downstream side imaginary path line L4, along the direction of, or along, the radius of curvature downstream side imaginary path line L4. And the six driven rollers 18 provided to the downstream side conveyer portion 14 are located to the left of the downstream side imaginary path line L4 as seen in the transporting direction so that they are located inwardly of the downstream side imaginary path line L4, along the direction of, or along, the radius of curvature of the downstream side imaginary path line L4. Thus, the ten driving rollers 17 provided to the downstream side conveyer portion 14 are located outwardly of the six driven rollers 18 provided to the downstream side conveyer portion 14, along the direction of, or along, the radius of curvature of the downstream side imaginary path line L4. Incidentally, the ten driving rollers 17 provided to the downstream side conveyer portion 14 are disposed one next to another along a circular arc of the same radius of curvature. And the six driven rollers 18 provided to the downstream side conveyer portion 14 are disposed one next to another along a circular arc of the same radius of curvature.

And the ten driving rollers 17 provided to the downstream side conveyer portion 14 are operatively connected by an interlocking belt 22. And the ten driving rollers 17 are driven and rotated by the drive power of an electric motor 16 for rollers.

To describe in more detail about the driving rollers 17 and the driven rollers 18 provided to the downstream side conveyer portion 14, The ten driving rollers 17 provided in the downstream side conveyer portion 14 are operatively connected to one another by an interlocking belt 22. And the ten driving rollers 17 are driven and rotated by the drive power of an electric motor 16 for rollers. In addition, each driven rollers 18 is rotatably provided at the other end portion of the rotatable shaft 23 of the driving roller 17.

As shown in FIG. 3, among the ten driving rollers 17 provided in the downstream side conveyer portion 14, the eight driving rollers 17 on the downstream side, that are located on the downstream side of the upstream side end portion of the downstream side conveyer portion 14, are provided in such orientation that their pivot axes are directed toward the center of curvature P of the downstream side imaginary path line L4. Incidentally, the six driven rollers 18 provided to the downstream side conveyer portion 14 are provided in such orientation that their pivot axes are directed toward the center of curvature P of the upstream side imaginary path line L3.

Figure 4:
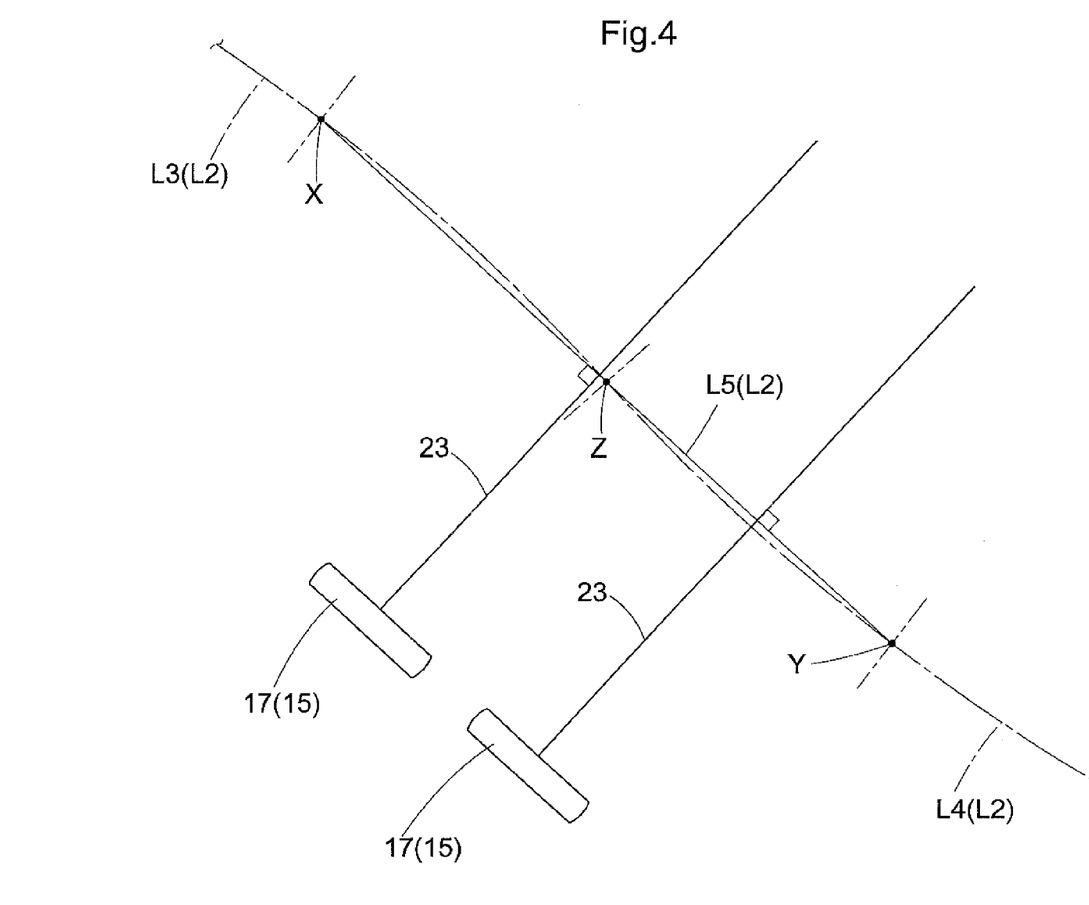
FIG. 4 is a plan view showing orientations of the driving rollers that function as a rotating operation transport device in accordance with an embodiment of the present invention.

And as shown in FIGS. 3 and 4, two driving rollers 17 on the upstream side provided in an upstream side end portion of the downstream side conveyer portion 14 are provided to function as the rotating operation transport device 15. And the two driving rollers 17 on the upstream as the rotating operation transport device 15 are not provided in such orientations that their pivot axes are directed toward the center of curvature P of the downstream side imaginary path line L4, and instead are provided in such orientations that their pivot axes intersect the line segment L5 perpendicularly, or at the right angle. Incidentally, this line segment L5 is a line segment that connects an upstream side connecting point X at an intermediate location on the upstream side imaginary path line L3 with a downstream side connecting point Y at an intermediate location on the downstream side imaginary path line L4 and that passes through the connecting point Z between the upstream side imaginary path line L3 and the downstream side imaginary path line L4.

And between the two driving rollers 17 in the upstream side end portion of the downstream side conveyer portion 14, the driving roller 17, of the two driving rollers 17, that is located on the upstream side is provided such that the pivot axis of its rotatable shaft 23 intersects the upstream side imaginary path line L3 and the line segment L5 at a location, or locations, between the upstream side connecting point X and the connecting point Z. And the driving roller 17, of these two driving rollers 17, that is located on the downstream side, is provided such that the pivot axis of its rotatable shaft 23 intersects the downstream side imaginary path line L4 and the line segment L5 at a location, or locations, between the downstream side connecting point Y and the connecting point Z.

In addition, the driving roller 17 located on the upstream side is provided in such an orientation that the pivot axis of its rotatable shaft 23 does not perpendicularly intersect the tangent line of the upstream side imaginary path line L3 at the intersection with the upstream side imaginary path line L3 but such that the pivot axis intersects perpendicularly with the line segment L5.

And the driving roller 17 located on the downstream side is provided in such an orientation that the pivot axis of its rotatable shaft 23 does not perpendicularly intersect the tangent line of the downstream side imaginary path line L4 at the intersection with the downstream side imaginary path line L4 but such that the pivot axis intersects perpendicularly with the line segment L5.

And the eight driving rollers 17, that are provided in such orientations that their pivot axes are directed toward the center of curvature P of the downstream side imaginary path line L4, apply propelling forces on an article along the tangential direction of the downstream side imaginary path line L4. However, the two driving rollers 17, that are provided in such orientations that their pivot axes are not directed toward the center of curvature P of the downstream side imaginary path line L4, apply propelling forces on an article in a direction inward of the tangential direction of the downstream side imaginary path line L4.

Figure 5:
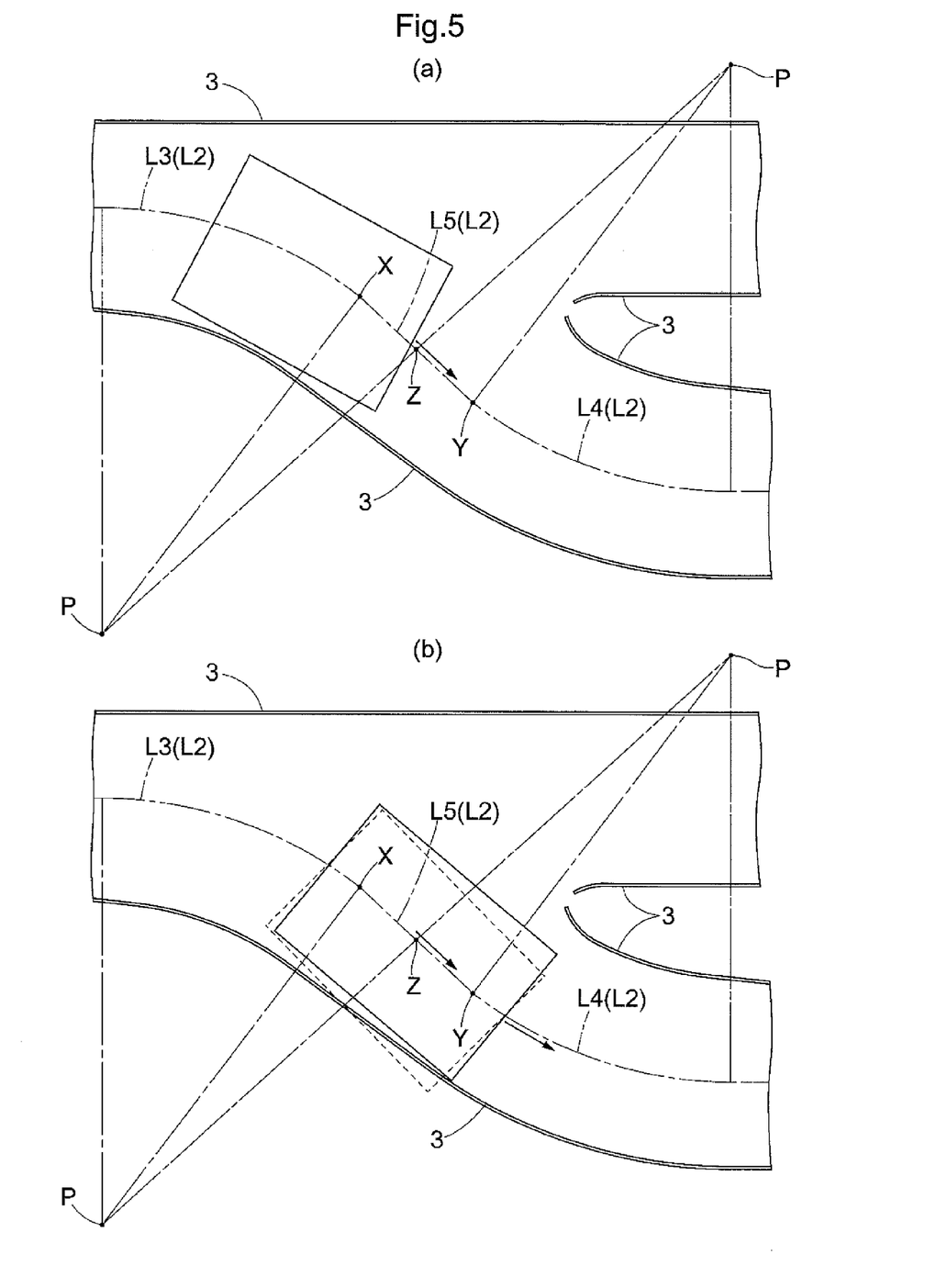
FIG. 5 is a drawing showing how the orientation of an article is changed by the transport conveyer in accordance with an embodiment of the present invention.

Therefore, as shown in FIG. 5, for an article being transported along the curved imaginary path line L2 by the curved conveyer 2, the amount of rotation caused by the transporting by the downstream side conveyer portion 14 increases when the front portion of the article is moved onto the downstream side conveyer portion 14, because of the action of the rotating operation transport device 15 provided in the upstream side end portion of the downstream side conveyer portion 14. Thus, for an article transported in this manner, it becomes easy for the front of the article to be transported along the downstream side imaginary path line L4 as the article is moved from the upstream side conveyer portion 13 and onto the downstream side conveyer portion 14. Incidentally, the orientation of the article shown with broken lines in FIG. 5(*b*) shows an estimated orientation of the article when the rotating operation transport device 15 is not provided.

And the articles being transported along the curved imaginary path line L2 are prevented from diverging in orientation to a large extent from the downstream side orientation, by the rotating operation transport device 15; thus, the articles are kept within the set lateral width so that the articles are kept from contacting the guide body 3 to the extent possible. When the load of the article is unbalanced or when a transporting error, such as a slip, occurs, the article tends to move away from set lateral width and the guide body 3 would contact the peripheral surface of the article.

[Alternative Embodiments]

(1) In the embodiment described above, the curved conveyer 2 is provided as a diverging transport conveyer; however, the curved conveyer 2 may be provided as a converging transport conveyer. In addition, arrangement may be made such that the transporting direction can be switched between the first direction and the second direction opposite to the first direction so that the curved conveyer 2 may be provided to function as both the diverging transport conveyer and the converging transport conveyer.

In addition, the curved conveyer 2 is connected to the intermediate portion of the linear conveyer 1 so that it functions as the diverging transport conveyer or the converging transport conveyer; however, the curved conveyer 2 may not be connected to the intermediate portion of the linear conveyer 1 so that it may function as a conveyer that does not perform a diverging transport or a converging, or merging, transport.

(2) In the embodiment described above, the rotating operation transport device 15 is provided in the upstream side end portion of the downstream side conveyer portion 14 so that an article is supported and transported such that the amount of rotation, of the article in plan view, that accompanies the transporting by the downstream side conveyer portion 14 is greater than or equal to the mount of rotation caused by the downstream side conveyer portion 14, by the rotating operation transport device 15. The rotating operation transport device 15 may be provided in the downstream side end portion of the upstream side conveyer portion 13 so that an article is supported and transported such that the amount of rotation, of the article in plan view, that accompanies the transporting by the upstream side conveyer portion 13 is less than or equal to the mount of rotation caused by the upstream side conveyer portion 13, by the rotating operation transport device 15. The amount of rotation caused by the upstream side conveyer portion 13 is the amount of rotation of an article when the article is supported and transported in the upstream side orientation along the upstream side imaginary path line L3.

In addition, the rotating operation transport device 15 may be provided in both the downstream side end portion of the upstream side conveyer portion 13, and the upstream side end portion of the downstream side conveyer portion 14.

(3) The installation positions, along the direction of, along, the radius of curvature, of the driving rollers 17 that function as the rotating operation transport device 15 may be changed as appropriate. In other words, the driving rollers 17 that function as the rotating operation transport device 15 may be located closer to the center of curvature along the direction of, or along, the radius of curvature than the positions described in the embodiment described above.

Also, for example, when providing a driving roller 17 that function as the rotating operation transport device 15 in the downstream side end portion of the upstream side conveyer portion 13, the driving roller 17 may be provided in place of the driven roller 18 that is located on the most downstream side among the six driven rollers 18 provided in the downstream side conveyer portion 14 in the embodiment described above. Incidentally, in the embodiment described above, the driven roller 18 that is located in the most downstream side is provided such that its pivot axis does not intersect perpendicularly with the tangent line of the upstream side imaginary path line L3 at the intersection with the upstream side imaginary path line L3 and such that its pivot axis intersects perpendicularly with the line segment L5.

(4) In the embodiment described above, the downstream side imaginary path line L4 is defined to have a circular-arc shape. And the downstream side imaginary path line L4 is defined such that the tangent line at the downstream side end of the upstream side imaginary path line L3 of a circular-arc shape and the tangent line at the upstream side end of the downstream side imaginary path line L4 of a circular-arc shape are at the same angle. However, the downstream side imaginary path line L4 may be set up to have a linear shape. And the downstream side imaginary path line L4 may be defined such that the tangent line at the downstream side end of the upstream side imaginary path line L3 of a circular-arc shape and the upstream side end of the downstream side imaginary path line L4 of a linear shape are at the same angle.

(5) In the embodiment described above, the driving rollers 17 are provided such that they are located outwardly of the imaginary path lines along the directions of the radius of curvature of the upstream side imaginary path line L3 and of the downstream side imaginary path line L4. And the driven rollers 18 are provided such that they are located inwardly of the imaginary path lines along the directions of the radius of curvature of the upstream side imaginary path line L3 and of the downstream side imaginary path line L4. However, the driving rollers 17 may also be located inwardly of the imaginary path line along the direction of, or along, the radius of curvature in place of the driven rollers 18, as follows.

Specifically, provided inwardly, along the direction of, or along, the radius of curvature, of the imaginary path line may be, for example, driving rollers 17 that have an outer diameter which is smaller than the driving rollers 17 on the outward side and that rotate at the same rotation speed as the driving rollers 17 on the outward side, or driving rollers 17 that have an outer diameter which is the same as that of the driving rollers 17 on the outward side and that rotate at a lower rotation speed than the driving rollers 17 on the outward side. Thus, driving rollers 17 whose circumferential speeds are lower than the driving rollers 17 on the outward side may be provided inwardly along the direction of, or along, the radius of curvature of the imaginary path line.

Incidentally, when providing driving rollers 17 that have an outer diameter which is smaller than the driving rollers 17 on the outward side and that rotate at the same rotation speed as the driving rollers 17 on the outward side, the driving rollers 17 on the outward side and the driving rollers 17 on the inward side may be formed integrally by providing driving rollers 17 having a corn shape that tapers toward the center of curvature along the direction of, or along, the radius of curvature.

(6) In the embodiment described above, a plurality of driving rollers 17 that function as the rotating operation transport device 15 are provided in such orientations that they intersect perpendicularly with the line segment L5. However, when providing a plurality of driving rollers 17, that function as the rotating operation transport device 15, in the downstream side end portion of the upstream side conveyer portion 13, the driving rollers 17 may be provided in an orientation which is between an orientation in which they intersect perpendicularly with the line segment L5 and an orientation in which the pivot axis is directed toward the center of curvature P of the upstream side imaginary path line L3. Also, when providing a plurality of driving rollers 17, that function as the rotating operation transport device 15, in the upstream side end portion of the downstream side conveyer portion 14, the driving rollers 17 may be provided in an orientation which is between an orientation in which they intersect perpendicularly with the line segment L5 and an orientation in which the pivot axis is directed toward the center of curvature P of the downstream side imaginary path line L4.

(7) In the embodiment described above, two connection portions 10 are provided in the curved conveyer 2 along the linear imaginary path line L1 of the linear conveyer 1. And the two connection portions 10 are configured to be independently moved vertically. However, three or more connection portions 10 may be provided along the linear imaginary path line L1 of the linear conveyer 1. And the three or more connection portions 10 may be configured to be independently moved vertically. In addition, only one connection portion 10 may be provided.

(8) In the embodiment described above, among a plurality of driving rollers 17 provided in the connection portion 10, the four driving rollers 17 that define the first group of driving rollers G1 are disposed one next to another along a circular arc having a smaller radius of curvature than the circular arc for the four driving rollers 17 that define the second group of driving rollers G2. However, all of the plurality of driving rollers 17 provided in the connection portion 10 may be provided such that they are disposed one next to another along a circular arc having the same radius of curvature.

(9) In the embodiment described above, a rectangular article in plan view is an article having a shape of an elongate rectangle in plan view in which two of its sides that intersect each other perpendicularly are of different lengths. However, the rectangular article in plan view may be an article having a square shape in plan view in which two of its sides that intersect each other perpendicularly are of the same length.

INDUSTRIAL APPLICABILITY

The present invention may be advantageously used in a transport conveyer for supporting and transporting articles that are rectangular in shape in plan view, and in transport facility equipped with the transport conveyer.

DESCRIPTION OF REFERENCE NUMERALS AND SYMBOLS

- 1 Linear conveyer
- 2 Transport conveyer
- 3 Guide body
- 4 Transport portion
- 10 Connection portion
- 11 Side portion
- 13 Upstream side conveyer portion
- 14 Downstream side conveyer portion
- 15 Rotating operation transport device
- 17 Driving roller
- G1 First group of driving rollers
- G2 Second group of driving rollers
- L1 Linear imaginary path line
- L3 Upstream side imaginary path line
- L4 Downstream side imaginary path line
- P Center of curvature

The invention claimed is:

1. A transport conveyer comprising:

an upstream side conveyer portion for supporting and transporting an article which is rectangular in shape in plan view, along an upstream side imaginary path line; and a downstream side conveyer portion for supporting and transporting an article along a downstream side imaginary path line, the downstream side conveyer portion being connected to a downstream side of the upstream side conveyer portion;

wherein the upstream side imaginary path line is defined to have a circular-arc shape, wherein the upstream side conveyer portion is configured to support and transport the article while rotating the article about a vertical axis to cause the article to be in an upstream side orientation in which a lateral side of the article is parallel to a tangent line of the upstream side imaginary path line, wherein a guide body is provided for guiding the article such that the article stays within a set lateral width by contacting a peripheral surface of the article, the guide body being provided along the upstream side imaginary path line and the downstream side imaginary path line, wherein the upstream side conveyer portion is provided such that the upstream side imaginary path line is connected to the downstream side imaginary path line, and such that a tangent line of the upstream side imaginary path line at a downstream side end thereof and a tangent line of the downstream side imaginary path line at the upstream side end thereof are at a same angle, wherein the upstream side imaginary path line of the upstream side conveyer portion is defined to have a circular-arc shape with curves toward a first direction out of right and left directions, wherein the downstream side imaginary path line of the downstream side conveyer portion is defined to have a circular-arc shape which curves toward a second direction out of the right and left directions, wherein each of the upstream side conveyer portion and the downstream side conveyer portion is configured to be of a roller drive type in which the article is supported and transported by rotation of driving rollers which are driven and rotated by an actuating device, wherein the driving roller provided on an upstream side relative to a downstream side end region of the upstream side conveyer portion is an upstream side first driving roller, the upstream side first driving roller being provided in such an orientation that its pivot axis passes through a center of curvature of the upstream side imaginary path line, wherein the driving roller provided on a downstream side relative to the upstream side end region of the downstream side conveyer portion is a downstream side first driving roller, the downstream side first driving roller being provided in such an orientation that its pivot axis passes through a center of curvature of the downstream side imaginary path line, wherein there is provided a rotating operation transport device including: an upstream side second driving roller which is the driving roller provided in the downstream side end region of the upstream side conveyer portion; or a downstream side second driving roller which is the driving roller provided in the upstream side end region of the downstream side conveyer portion, a pivot axis of the upstream side second driving roller is oriented so that a portion of the pivot axis outward in a direction along a radius of curvature relative to an intersection of the pivot axis and the upstream side imaginary path line is disposed on an upstream side relative to a straight line through the intersection and the center of curvature of the upstream side imaginary path line, and a pivot axis of the downstream side second driving roller is oriented so that a portion of the pivot axis outward in a direction along a radius of curvature relative to an intersection of the pivot axis and the downstream side imaginary path line is disposed on a downstream side relative to a straight line through the intersection and the center of curvature of the downstream side imaginary path line.

2. The transport conveyer as defined in claim 1, wherein the upstream side second driving roller or the downstream side second driving roller of the rotating operation transport device is provided in such an orientation that a pivot axis of the driving roller perpendicularly intersects a line segment that connects an intermediate location on the upstream side imaginary path line with an intermediate location on the downstream side imaginary path line, and that passes through a connecting point between the upstream side imaginary path line and the downstream side imaginary path line.

3. The transport conveyer as defined in claim 2, wherein the driving roller is so positioned to be outward of a freely rotatable driven roller for receiving and supporting the article, along a direction along a radius of curvature of the upstream side imaginary path line or the downstream side imaginary path line.

4. A transport facility comprising:

a linear conveyer for supporting and transporting an article along a linear imaginary path line defined to have a linear shape;

wherein the transport conveyer as defined in claim 1 is provided as a diverging transport conveyer for performing a diverging transport of the article from the linear conveyer, or as a converging transport conveyer for performing a converging transport of the article into the linear conveyer.

5. The transport facility as defined in claim 4, wherein the linear conveyer includes a pair of transport portions which are spaced apart from each other in a lateral direction of the linear conveyer, and which are configured to support and transport an article along the linear imaginary path line while receiving and supporting both end portions, in the lateral direction, of the article, wherein the transport conveyer includes a connection portion located between the pair of transport portions of the linear conveyer, and a side portion located to a lateral side of the linear conveyer, wherein the side portion is so provided that a transporting surface of the side portion is located higher than transporting surfaces of the pair of transport portions, and wherein the connection portion can be moved vertically between a transport position in which a transporting surface of the connection portion is higher than the transporting surfaces of the pair of transport portions and is at a same height as the transporting surface of the side portion, and a retracted position in which the transporting surface of the connection portion is lower than the transporting surfaces of the pair of transport portions.

6. The transport facility as defined in claim 5, wherein a plurality of the connection portions of the transport conveyer are provided along the linear imaginary path line of the linear conveyer, and wherein each of the plurality of connection portions is configured to be able to be vertically moved independently from one another.

7. The transport facility as defined in claim 5, wherein a plurality of driving rollers that are provided in the connection portion and that are driven and rotated by an actuating device are disposed one next to another: along a circular arc along the upstream side imaginary path line of the upstream side conveyer portion; or along the downstream side imaginary path line of the downstream side conveyer portion, in which the plurality of driving rollers are provided, and wherein a first group of driving rollers which are a part of the plurality of the driving rollers are disposed one next to another such that a radius of curvature for the first group of driving rollers is smaller compared with a radius of curvature for a second group of driving rollers, among the plurality of the driving rollers, that are located closer to the side portion than the first group of driving rollers.

8. A transport facility comprising:

a linear conveyer for supporting and transporting an article along a linear imaginary path line defined to have a linear shape;

wherein a transport conveyer is provided as a diverging transport conveyer for performing a diverging transport of the article from the linear conveyer, or as a converging transport conveyer for performing a converging transport of the article into the linear conveyer, the transport conveyor comprising:

an upstream side conveyer portion for supporting and transporting an article which is rectangular in shape in plan view, along an upstream side imaginary path line; and a downstream side conveyer portion for supporting and transporting an article along a downstream side imaginary path line, the downstream side conveyer portion being connected to a downstream side of the upstream side conveyer portion;

wherein the upstream side imaginary path line is defined to have a circular-arc shape, wherein the upstream side conveyer portion is configured to support and transport the article while rotating the article about a vertical axis to cause the article to be in an upstream side orientation in which a lateral side of the article is parallel to a tangent line of the upstream side imaginary path line, wherein a guide body is provided for guiding the article such that the article stays within a set lateral width by contacting a peripheral surface of the article, the guide body being provided along the upstream side imaginary path line and the downstream side imaginary path line, wherein the upstream side conveyer portion is provided such that the upstream side imaginary path line is connected to the downstream side imaginary path line, and such that a tangent line of the upstream side imaginary path line at a downstream side end thereof and an upstream side end, or a tangent line at the upstream side end, of the downstream side imaginary path line are at a same angle, wherein there is provided a rotating operation transport device which is provided in a downstream side end region of the upstream side conveyer portion and which supports and transports the article such that an amount of rotation of the article that accompanies transporting by the upstream side conveyer portion is less than or equal to an amount of rotation caused by the downstream side conveyer portion and which supports and transports the article such that an amount of rotation of the article that accompanies transporting by the downstream side conveyer portion is greater than or equal to an amount of rotation caused by the downstream side conveyer portion, wherein the linear conveyer includes a pair of transport portions which are spaced apart from each other in a lateral direction of the linear conveyer, and which are configured to support and transport an article along the linear imaginary path line while receiving and supporting both end portions, in the lateral direction, of the article, wherein the transport conveyer includes a connection portion located between the pair of transport portions of the linear conveyer, and a side portion located to a lateral side of the linear conveyer, wherein the side portion is so provided that a transporting surface of the side portion is located higher than transporting surfaces of the pair of transport portions, and wherein the connection portion can be moved vertically between a transport position in which a transporting surface of the connection portion is higher than the transporting surfaces of the pair of transport portions and is at a same height as the transporting surface of the side portion, and a retracted position in which the transporting surface of the connection portion is lower than the transporting surfaces of the pair of transport portions.

9. The transport facility as defined in claim 8, wherein the upstream side imaginary path line of the upstream side conveyer portion is defined to have a circular-arc shape with curves toward a first direction out of right and left directions, wherein the downstream side imaginary path line of the downstream side conveyer portion is defined to have a circular-arc shape which curves toward a second direction out of the right and left directions, and wherein the upstream side conveyer portion and the downstream side conveyer portion are provided such that the tangent line of the upstream side imaginary path line at the downstream side end thereof and the tangent line of the downstream imaginary path line at the upstream side end thereof are at a same angle.

10. The transport facility as defined in claim 9,
wherein each of the upstream side conveyer portion and the downstream side conveyer portion is configured to be of a roller drive type in which the article is supported and transported by rotation of driving rollers which are driven and rotated by an actuating device,
wherein the driving roller provided on an upstream side relative to the downstream side end region of the upstream side conveyer portion is provided in such an orientation that its pivot axis is directed toward a center of curvature of the upstream side imaginary path line,
wherein the driving roller provided on an downstream side relative to the upstream side end region of the downstream side conveyer portion is provided in such an orientation that its pivot axis is directed toward a center of curvature of the downstream side imaginary path line,
wherein the driving roller, provided in the downstream side end region of the said upstream side conveyer portion or in the upstream side end region of the downstream side conveyer portion, functions as the rotating operation transport device, and
wherein the driving roller that functions as the rotating operation transport device is provided in such an orientation that a pivot axis of the driving roller perpendicularly intersects a line segment that connects an intermediate location on the upstream side imaginary path line with an intermediate location on the downstream side imaginary path line, and that passes through a connecting point between the upstream side imaginary path line and the downstream side imaginary path line.

11. The transport facility as defined in claim 10,
wherein the driving roller is so positioned to be outward of a freely rotatable driven roller for receiving and supporting the article, along a direction along a radius of curvature of the upstream side imaginary path line or the downstream side imaginary path line.

12. The transport facility as defined in claim 8,
wherein a plurality of the connection portions of the transport conveyer are provided along the linear imaginary path line of the linear conveyer, and
wherein each of the plurality of connection portions is configured to be able to be vertically moved independently from one another.

13. The transport facility as defined in claim 12,
wherein a plurality of driving rollers that are provided in the connection portion and that are driven and rotated by an actuating device are disposed one next to another: along a circular arc along the upstream side imaginary path line of the upstream side conveyer portion; or along the downstream side imaginary path line of the downstream side conveyer portion, in which the plurality of driving rollers are provided, and
wherein a first group of driving rollers which are a part of the plurality of the driving rollers are disposed one next to another such that a radius of curvature for the first group of driving rollers is smaller compared with a radius of curvature for a second group of driving rollers, among the plurality of the driving rollers, that are located closer to the side portion than the first group of driving rollers.

* * * * *